United States Patent [19]

Robare et al.

[11] Patent Number: 5,032,171
[45] Date of Patent: Jul. 16, 1991

[54] ALUMINUM SCRAP RECOVERY BY INDUCTIVELY MOVING MOLTEN METAL

[75] Inventors: Thomas J. Robare, New Kensington; Jeffrey B. Gorss, Wexford; Robert A. Gutknecht, Arnold; J. Richard Semk, Delmont, all of Pa.

[73] Assignee: Aluminum Company of America, Pittsburgh, Pa.

[21] Appl. No.: 450,661

[22] Filed: Dec. 14, 1989

[51] Int. Cl.$^5$ ............................................. C22B 4/02
[52] U.S. Cl. .................................... 75/10.18; 75/687; 75/685
[58] Field of Search .................. 75/10.18, 63, 68 R, 75/93 AC, 685, 687

[56] References Cited

U.S. PATENT DOCUMENTS 4,571,258  2/1986  Bamji et al. ............................ 75/10.18

FOREIGN PATENT DOCUMENTS 711141  1/1980  U.S.S.R. ............................ 75/10.18

Primary Examiner—Melvyn J. Andrews
Attorney, Agent, or Firm—Andrew Alexander

[57] ABSTRACT

A method for removing dissolved alkali metals and alkaline earth metals from aluminum is disclosed. The method comprises providing a body of molten aluminum containing the alkali metal and alkaline earth metals in a container and inductively moving the molten aluminum in upper regions of the body in a generally downward direction at outward regions of the body and in a generally upward direction in inner regions of the body. Fluoride values are added to the body to react with the alkali metals or alkaline earth metals.

20 Claims, 3 Drawing Sheets

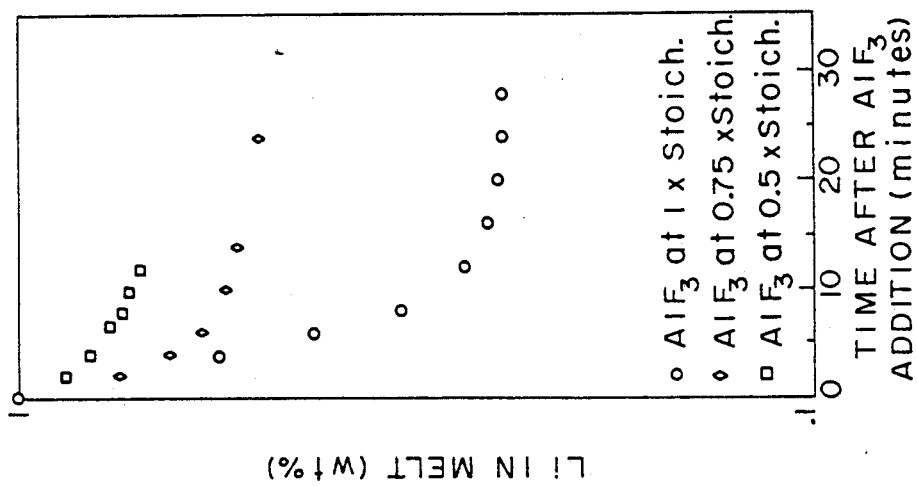
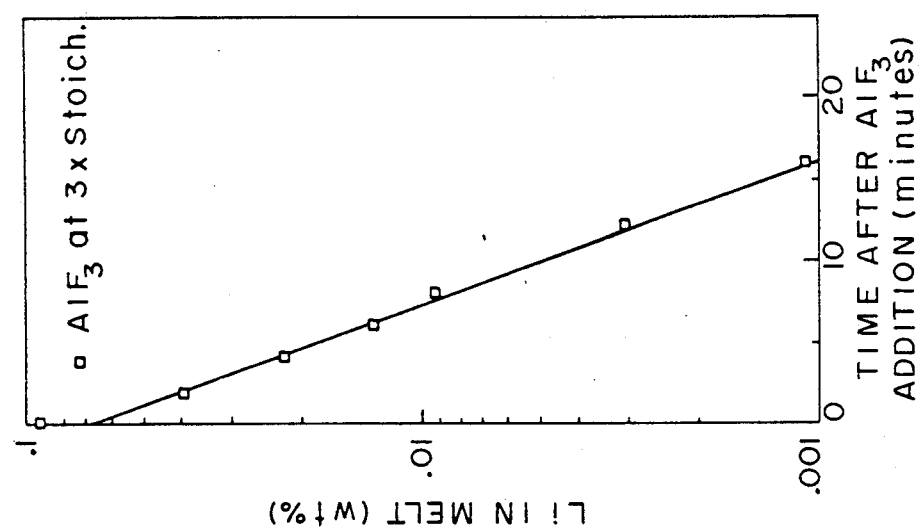

ALUMINUM SCRAP RECOVERY BY INDUCTIVELY MOVING MOLTEN METAL

BACKGROUND OF THE INVENTION

The invention relates to aluminum-lithium alloys and more particularly, it relates to recycling of aluminum-lithium alloy scrap.

The use of aluminum-lithium alloys in aerospace applications is entering an accelerating growth phase. The lower density and increased stiffness associated with aluminum-lithium alloys can result in significant weight savings. For example, alloy 2090 provides 8% lower density and a 10% higher modulus than the conventional aluminum alloys. These weight savings enable the airframe designer to provide an aircraft with either increased range or payload, or a faster, more maneuverable aircraft. Aluminum-lithium alloys are being evaluated by all the major airframe manufacturers, and their application to structural components is expected to grow significantly.

The amount of aluminum-lithium scrap that will be generated by airframers depends on variables such as the buy-to-fly ratio and the degree of segregation. Normal buy-to-fly ratios range from 2:1 to 4:1 depending on the type of fabrication. Even at poor buy-to-fly ratios, and some approximate segregation, aluminum-lithium alloys will become a large problem in the aluminum scrap market.

Aluminum-lithium scrap causes remelting concerns if handled in the regular scrap loop. Some of the problems are: metallurgical property changes in recovered alloys; adverse effects on refractories; adverse effects on metal cleanliness; higher melt losses to dross; safety and industrial hygiene problems; environmental issues; and higher cost of recycling/recovery.

Lithium is considered an impurity in commercial nonlithium aluminum alloys. As an impurity, lithium falls into the "others each" category of the operating limits, generally 0.05%, for 2XXX to 6XXX series alloys. Thus, the maximum theoretical level of lithium that could be tolerated and still be acceptable is 0.05%; however, in practice, the lithium level could not attain this level due to the 0.15% limit imposed for "others total".

In commercial aluminum alloys, it is known that concentrations of lithium of less than 0.0005% (5 ppm) can promote discoloration in foil under humid conditions and increase the oxidation rate of molten aluminum as well as alter surface characteristics of wrought products.

It has been suggested that lithium impurity levels in the 0.005-0.1% range have an overall adverse effect on the properties such as strength and ductility of aluminum alloy wrought products. To what degree the relative amounts of lithium in this range affect properties is presently unknown.

Studies performed on standard alloys at the 0.1% lithium impurity level attribute strength and ductility loss to increased gas content ($H_2$) and formation of lithium bearing phases (e.g., LiH) at the grain boundaries.

The present method for recycling lithium-containing aluminum scrap can recover 95% of the lithium from the scrap. Lithium in the recovered metal can be less than 10 ppm or 0.001 wt. %.

BRIEF DESCRIPTION OF THE DRAWINGS

FIG. 3 shows the amount of lithium in the melt after $AlF_3$ is added.

FIG. 4 shows the amount of lithium in the melt after using different amounts of $AlF_3$.

SUMMARY OF THE INVENTION

Disclosed is a method for removing dissolved alkali metals and alkaline earth metals from aluminum comprising providing a body of molten aluminum containing the alkali metal and alkaline earth metals in a container and inductively moving the molten aluminum in upper regions of the body in a generally downward direction at outward regions of the body and in a generally upward direction in inner regions of the body. Fluoride values are added to the body to react with the alkali metals or alkaline earth metals.

DETAILED DESCRIPTION OF THE PREFERRED EMBODIMENTS

Figure 5:
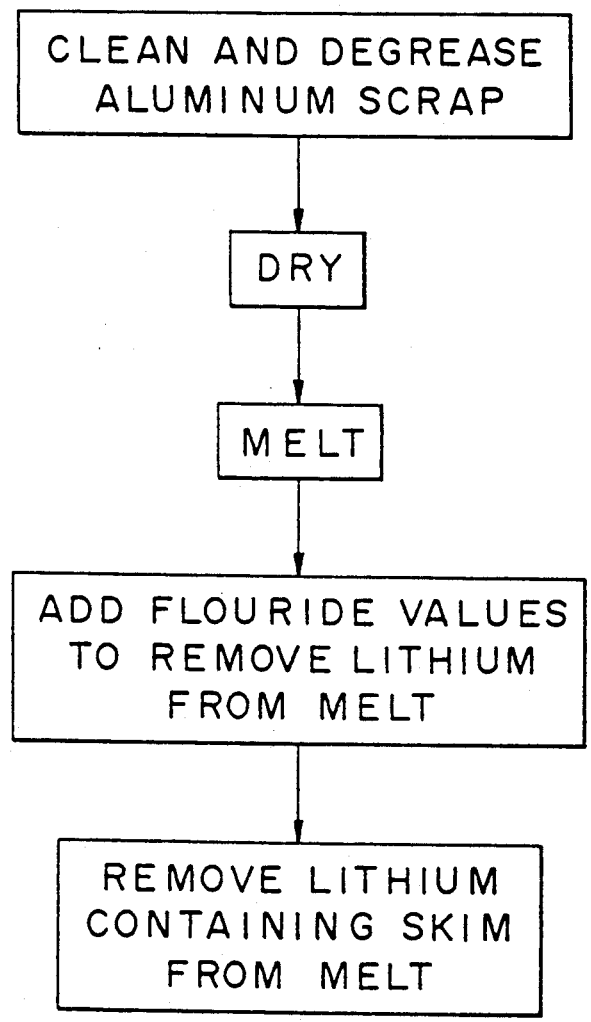
FIG. 5 shows steps of the process.

In accordance with the invention, aluminum containing contaminants of alkali metals and alkaline earth metals such as lithium is provided in an induction melting furnace. The aluminum may be in the form of scrap. The scrap may be added in molten form to the furnace or it may be melted in the induction furnace. The induction furnace induces a turbulence or movement of the molten aluminum and fluoride values such as $AlF_3$ is then added to the melt. Before charging and melting the scrap, it should be cleaned of residual oils and lubricants and even degreased if necessary, as shown in FIG. 5. Further, the scrap should be dried before melting so as to remove water. The melt may be analyzed to determine the lithium content and provide for the correct amount of $AlF_3$ for example which is to be added. FIG. 5 provides the steps of treating lithium-containing scrap in accordance with the invention. The steps are: clean and degrease, dry, melt, add fluoride values, remove skim, and process skim, if desired.

Most of the scrap contains lubricants used in the machining operations. These can vary from 1-5 wt. % of the scrap charge and can be water emulsion types or straight hydrocarbon oils. Since the melting is done in an induction type melter, the scrap must be cleaned prior to charging. The flowable scrap such as chips, cuttings and borings will immediately be ingested due to the moving metal. The oils can vaporize or can carburize and add harmful carbon inclusions to the melt. The cleaning solutions used must be treated and made acceptable for discharge.

If a water/detergent cleaning agent is used, the scrap should be dried before charging into the induction melter. If a solvent, such as hexane, is used, drying may not be required. The drying atmosphere should not contain the hot products of combustion because of the higher surface reaction rate of aluminum-lithium alloys with both carbon dioxide and water vapor. Also, most lubricating oils start to boil at about 400° F., and at temperatures over 500° F., the oxidation of high surface area scraps will significantly lower metal recovery.

The preferred method of melting lithium-containing scraps is induction melting. This eliminates the exposure of the melt to combustion gases. Additionally, induction melting has an inherently lower melt loss. The melt loss can be further reduced by inerting the atmosphere over the molten metal, and by inert furnace charging.

In the process of the instant invention for stripping lithium from melts of aluminum-lithium alloys, the initial lithium concentration can be as high as 2.5%. Aluminum fluoride reacts with the lithium in the melt to form lithium fluoride according to the reaction $3Li + AlF_3 \rightarrow 3LiF + Al$. The process may be carried out in one step wherein $AlF_3$ is added to the melt and held in contact with the molten aluminum until dissolved lithium, for example, is removed to a very low level, e.g., 0.01 or 0.001 wt. %. The process preferably is carried out in two steps. The first step can use a stoichiometrically calculated weight of $AlF_3$ corresponding to the lithium concentration in the melt. The $AlF_3$ is stirred through the melt by the movement of an induction melter. FIG. 4 is a plot of lithium concentration in the melt versus time. The furnace is then skimmed and a second addition of $AlF_3$ equal to about three times the newly calculated stoichiometric requirement is made. In the first step, the stoichiometric ratio can range from 0.5:1 to 5:1 and 2:1 to 5:1 for the second step.

After the reaction takes place in a time of 1 to 15 minutes, for example, the furnace power is turned off and the skim allowed to float to the top of the melt. The skim can be removed with only about 10% aluminum metal content. X-ray diffraction analyses of skim show it to be mainly $3LiF.AlF_3$ (lithium cryolite) with a very minor amount of $LiAlO_2$. The skim can be transferred immediately to a rotary skim cooler where most of the aluminum metal can agglomerate and separate from the dross by sizing screens. The metal may be returned to the scrap melter for remelting and the skim fines can be further processed.

Minimizing oxidation of the melt, along with good initial scrap cleaning in accordance with the invention, can produce a foundry grade aluminum product with inclusion ratings of less than 2 without additional furnace fluxing. Another advantage is that the fluoride salts are solids at normal melt temperatures of 1300°–1350° F., while chlorides are liquids. The solids are more readily removed than are small liquid globules.

A distinct advantage of the fluoride stripping process is that aluminum fluoride does not react appreciably with aluminum, the reaction rate is fast enough that oxidation losses are minimized (inerting of the melt atmosphere eliminates this loss), and total melt losses are held to the stoichiometric lithium weight loss. The fluoride salt is not reactive with water and is easier to store.

Fluoride values or fluoride materials which may be used in the present invention include gases such as HF and $SF_6$, and salts include NaF, KF, $AlF_3$, $CaF_2$, $KAlF_2$, $CaAlF_5$ and $NaAlF_4$.

Salts such as $AlF_3$ are not readily dissolved in the molten aluminum, and thus the use of an induction melting furnace keeps the $AlF_3$ submerged for sufficient time for the reaction of the alkali metal or alkaline earth metal to take place. A reaction time of more than 20 minutes is not normally needed, but longer times are not known to be detrimental.

Figure 1:
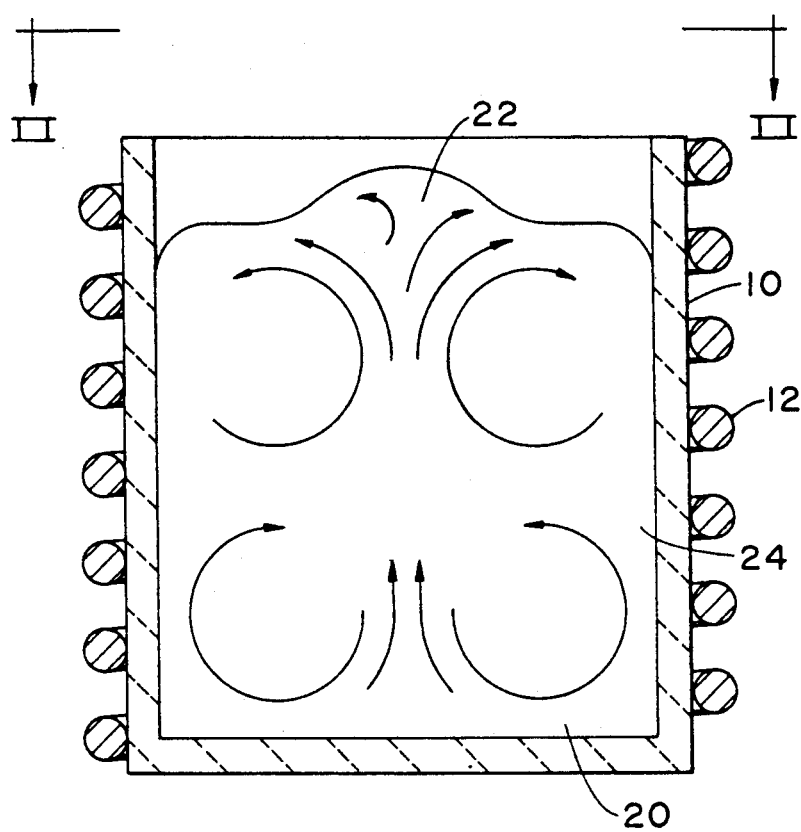
FIG. 1 is a sectional view of an induction furnace depicting the molten metal flow therein.
Figure 2:
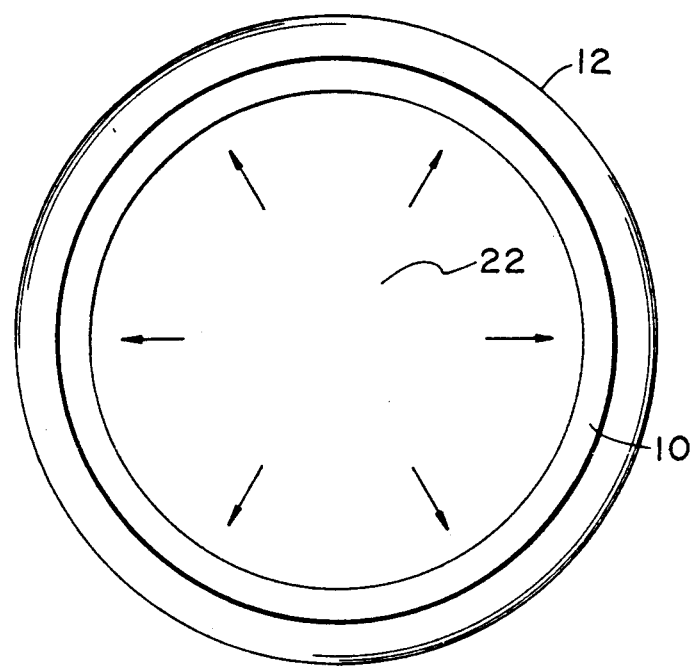
FIG. 2 is a top view of the furnace showing metal flow at the surface.

As shown in FIG. 1, container 10 has induction coils 12. Molten aluminum 20 subjected to induction has a flow pattern where the molten metal rises up in the center portion or inner region 22. The molten metal then flows in a generally downward direction at outer regions 24 of the body of molten aluminum. This movement of the molten metal has the effect of ingesting fluoride containing material into the melt and keeping it submerged for purposes of effecting the reaction. The induction heater provides a further important feature. That is, while stirring, the induction coils provide heat and thus the temperature of the reaction can be controlled or maintained.

The reaction temperature can extend from the melting point of the aluminum to 1400° F. The instant invention is capable of removing materials such as lithium from high levels, e.g., 3.0 wt. %, to very low levels, e.g., 0.001 wt. %. As will be seen from FIGS. 3 and 4, the level of lithium remaining in the melt is a function of contacting time with $AlF_3$. For example, 0.01 wt. % lithium can be achieved in 7.5 minutes.

After the reaction has taken place, the induction heater may be turned off to stop movement of the melt and permit reaction products to float thereon. When $AlF_3$ is used, the reaction product is mainly lithium cryolite, $3LiF.AlF_3$. The reaction is of the type where lithium reacts with the $AlF_3$ to produce LiF and free aluminum.

The following examples are further illustrative of the invention.

EXAMPLE 1

5,000 pounds of solid Al-Li alloy scrap containing 2.10% Li was added to an induction melter (an ASEA Brown Boveri IT-7 induction furnace) containing a molten heel of 5,000 pounds of pure aluminum. The resultant 10,000 pound melt contained 1.05% Li (105 pounds). The stoichiometric charge of $AlF_3$ was calculated according to $3Li + AlF_3 \rightarrow 3LiF$ or $105 \times 84/21 = 420$ pounds of $AlF_3$. Two 100 pound bags of smelter grade $AlF_3$ were added to the induction furnace, the power was raised to TAP 4 on the furnace, the paper burned off and the $AlF_3$ solids were mixed into the melt by the radically outward and downward movement created by the magnetic field. The stoichiometric ratio of $AlF_3$ to Li in the melt is 0.5. Metal samples were taken every two minutes. The metal samples were analyzed, and the results are as follows:

| Time (min.) | % Lithium Residual in Melt |
| --- | --- |
| 0 | 1.05 |
| +2 | 0.88 |
| +4 | 0.81 |
| +6 | 0.78 |
| +8 | 0.74 |
| +10 | 0.72 |
| +12 | 0.70 |
| +20 | 0.70 |
| +24 (hrs) | 0.60 |

EXAMPLE 2

The same melt combination as in Example 1 was used, but three 100 pound bags of smelter grade $AlF_3$ were added. This represents about a 0.75 stoichiometric ratio of $AlF_3$ to Li. The results are as follows:

| Time (min.) | % Lithium Residual in Melt |
| --- | --- |
| 0 | 1.05 |
| +2 | 0.75 |

| Time (min.) | % Lithium Residual in Melt |
| --- | --- |
| +4 | 0.67 |
| +6 | 0.60 |
| +8 | 0.55 |
| +10 | 0.54 |
| +12 | 0.53 |
| +20 | 0.50 |
| +24 (hrs) | 0.36 |

EXAMPLE 3

The same melt combination as in Example 1 was used, but four 100 pound bags of smelter grade AlF$_3$ were added. This represents a 1:1 stoichiometric ratio of AlF$_3$ to Li. The results are as follows:

| Time (min.) | % Lithium Residual in Melt |
| --- | --- |
| 0 | 1.05 |
| +2 | 0.72 |
| +4 | 0.57 |
| +6 | 0.42 |
| +8 | 0.33 |
| +10 | 0.28 |
| +12 | 0.26 |
| +20 | 0.25 |
| +24 (hrs) | 0.07 |

EXAMPLE 4

The melt in Example 3 was skimmed and the residual lithium analyzed as 0.07%. A charge of AlF$_3$ was calculated as seven pounds of lithium × 84/21 = 28 pounds at a 1.0 stoichiometric ratio of AlF$_3$ to Li. One 50 pound bag of smelter grade AlF$_3$ was added to the furnace and mixing continued as in Example 1. This represents about a 1.75 stoichiometric ratio. The results are as follows:

| Time (min.) | % Lithium Residual in Melt |
| --- | --- |
| 0 | 0.070 |
| +2 | 0.051 |
| +4 | 0.032 |
| +6 | 0.028 |
| +8 | 0.025 |
| +10 | 0.020 |
| +20 | 0.010 |

EXAMPLE 5

A 10,000 pound melt containing 0.079% Li was contained in an induction melter. The stoichiometric charge of AlF$_3$ was calculated to be 7.9 × 4 = 31.6 pounds. One 100 pound bag of smelter grade AlF$_3$ was tossed into the furnace and mixing continued as in Example 1. The represents a stoichiometric ratio of 3.2:1. The results are as follows:

| Time (min.) | % Lithium Residual in Melt |
| --- | --- |
| 0 | 0.079 |
| +2 | 0.045 |
| +4 | 0.033 |
| +6 | 0.018 |
| +8 | 0.009 |
| +10 | 0.005 |
| +12 | 0.002 |
| +14 | 0.001 |
| +16 | 0.001 |

EXAMPLE 6

A 10,000 pound melt containing 2.35% Li was contained in an induction melter. The 1.0 stoichiometric charge of AlF$_3$ was calculated to be 235 × 4 = 940 pounds. Ten 100 pound bags of smelter grade AlF$_3$ were added to the furnace and allowed to mix for 20 minutes. The melt was skimmed and sampled. The residual lithium in the melt was 0.55%. A second calculation of three times the stoichiometric ratio of AlF$_3$ showed 55 × 3 × 4 or 660 pounds were required. Six 100 pound bags were added to the melt and mixed for 20 minutes. The residual lithium was 0.005%.

Having thus described the invention, what is claimed is:

1. A method for removing alkali metals and alkaline earth metals from aluminum comprising:
    (a) providing a body of molten aluminum containing said alkali metal and alkaline earth metals in a container;
    (b) inductively moving said molten aluminum in upper regions of said body in a generally downward direction at outward regions of the body and in a generally upward direction in inner regions of the body; and
    (c) adding fluoride values, selected from HF, SF$_6$, NaF, KF, AlF$_3$, CaF$_2$, KAlF$_2$, CaAlF$_5$ and NaAlF$_4$, to said body to react with said alkali metals or alkaline earth metals.

2. The method in accordance with claim 1 wherein the fluoride values are an aluminum fluoride material.

3. The method in accordance with claim 1 wherein the fluoride values are added in a stoichiometric ratio ranging from 0.5:1 to 5:1.

4. The method in accordance with claim 1 including maintaining said aluminum fluoride material in the melt until the alkali metals or alkaline are present at a low level.

5. The method in accordance with claim 1 including separating reacted alkali metals and alkaline earth metal from the molten aluminum.

6. The method in accordance with claim 1 wherein the alkali metal is lithium.

7. The method in accordance with claim 1 wherein inductively moving said molten aluminum also heats the molten aluminum.

8. The method in accordance with claim 1 wherein when the fluoride values are added, the body is maintained at a temperature in the range of 1250° to 1400° F.

9. The method in accordance with claim 1 including adding said fluoride values in a first step in about a stoichiometric ratio based on the amount of alkali metals and alkaline earth metals present in the molten aluminum.

10. The method in accordance with claim 9 including removing reaction products after said first step.

11. The method in accordance with claim 10 including adding fluoride values after removing said reaction products, the fluoride values being added in an amount in the stoichiometric ratio range of 0.5:1 to 5:1 based on the amount of alkali metal or alkaline earth metals present in the molten aluminum.

12. A method for removing dissolved alkali metals and alkaline earth metals from aluminum comprising:
   (a) providing a body of molten aluminum containing said alkali metal and alkaline earth metals in a container;
   (b) inductively moving said molten aluminum in upper regions of said body in a generally downward direction at outward regions of the body and in a generally upward direction in inner regions of the body;
   (c) adding fluoride values, selected from HF, $SF_6$, NaF, KF, $AlF_3$, $CaF_2$, $KAlF_2$, $CaAlF_5$ and $NaAlF_4$, to said body to react with said alkali metals or alkaline earth metals;
   (d) maintaining movement of said body until said alkali metals or alkaline earth metals are reacted to leave only a low level thereof dissolved in the molten aluminum; and
   (e) separating said reacted alkali metals and alkaline earth metals from said molten aluminum.

13. The method in accordance with claim 12 wherein when the fluoride values are added, the body is maintained at a temperature in the range of 1250° to 1400°F.

14. The method in accordance with claim 12 wherein inductively moving said molten aluminum also heats the molten aluminum.

15. The method in accordance with claim 12 wherein the alkali metal is lithium.

16. A method for removing dissolved alkali metals and alkaline earth metals from aluminum comprising:
   (a) providing a body of molten aluminum containing said alkali metal and alkaline earth metals in a container;
   (b) inductively moving said molten aluminum in upper regions of said body in a generally downward direction at outward regions of the body and in a generally upward direction in inner regions of the body; and
   (c) adding an aluminum fluoride material to said body to react with said alkali metals or alkaline earth metals to provide reacted material, the aluminum fluoride material being added in substantially stoichiometric amounts based on the amount of alkali metal or alkaline earth metal in the melt;
   (d) removing reacted material from said body;
   (e) after removing reacted material, adding further aluminum fluoride to said body to react with residual alkali metals or alkaline earth metals to provide reacted material, the aluminum fluoride being added in a stoichiometric ratio range of 0.5:1 to 5:1 based on the amount of alkaline metal or alkaline earth metal in the melt; and
   (f) separating reacted alkali metal and alkaline earth metals from the molten aluminum.

17. The method in accordance with claim 16 wherein the alkali metal is lithium.

18. The method in accordance with claim 16 wherein the amount of $AlF_3$ added in step (e) of claim 15 is substantially in the stoichiometric ratio of about 3:1.

19. The method in accordance with claim 16 wherein the molten aluminum is maintained in the temperature range of 1250° to 1350° F. for reaction with the aluminum fluoride material.

20. The method in accordance with claim 16 wherein the molten aluminum is inductively heated during said moving step.

* * * * *